June 19, 1956 S. J. JOHNSON 2,750,631
PROCESS FOR MANUFACTURING RIBBED EXTRUDED SHEET MATERIAL
Filed July 22, 1952 2 Sheets-Sheet 1

INVENTOR.
Samuel J. Johnson.
BY
Wood, Herron & Evans.
ATTORNEYS.

June 19, 1956 — S. J. JOHNSON — 2,750,631
PROCESS FOR MANUFACTURING RIBBED EXTRUDED SHEET MATERIAL
Filed July 22, 1952 — 2 Sheets-Sheet 2

INVENTOR.
Samuel J. Johnson.
BY Wood, Herron & Evans.
ATTORNEYS.

United States Patent Office 2,750,631
Patented June 19, 1956

2,750,631

PROCESS FOR MANUFACTURING RIBBED EXTRUDED SHEET MATERIAL

Samuel J. Johnson, West Chester, Ohio, assignor to Clopay Corporation, Cincinnati, Ohio, a corporation of Maryland Application July 22, 1952, Serial No. 300,211

4 Claims. (Cl. 18—57)

This invention relates to sheet material of a type especially suitable for the manufacturing of window shades, draperies and other decorative articles. More particularly, the invention is directed to a process for manufacturing a material, having an attractive appearance coupled with particularly desirable physical characteristics.

It has previously been proposed that a thin sheet of material be produced from a thermoplastic organic composition such as polyethylene, vinyl chloride, or vinyl polymer. In one process for making this material, the plastic composition is heated and extruded through an annular die to form a seamless tube. The tube is inflated as it leaves the die so that it expands, reducing its wall thickness. The plastic material upon cooling becomes set to its final form after which the expanded tube is split and laid open to form a sheet.

The sheet material made according to the present invention is generally of this type but varies from the material previously available in two important respects. In the first place, instead of having a smooth, plain surface, the material of this invention is provided with a plurality of spaced parallel ridges or ribs, these ridges give to the material an exceedingly attractive appearance. Furthermore, the strength of the present material and its resistance to tearing is greatly increased over that of previous materials of a comparable thickness.

One of the advantages of the present sheet material is that it has an extremely attractive appearance due to the striped, or ribbed pattern. Furthermore the ribs effectively conceal any defects in the material resulting from faulty extrusion. For example, it frequently happens that a small piece of material or dirt will become clogged in the discharge opening of the extruder. This results in a streak or valley in the sheet of material. On a plain sheet, defects of this type are readily apparent and give the finished product a very unsightly appearance. However, when the surface of the sheet is ribbed, an additional depression, due to a piece of clogged material, is practically unnoticeable.

Another of the principal advantages of the present sheet material is that it possesses greatly increased strength in the direction extending transversely of the ribs. Consequently, in a window shade, for example, if the ribs extend vertically it is practically impossible to tear the shade when raising or lowering it. The ribs also inhibit any tendency of the material to deform or sag during hanging, so that the material will retain its proper shape even after long periods of use. Consequently the ribs not only perform a decorative function but also provide an extremely desirable physical characteristic as well.

One of the objectives of the present invention is to produce a sheet material having ribs on both sides of the sheet. Forming substantially identical ribs on opposite sides of the material, greatly enhances its appearance and utility, since it permits the material to be overfolded and arranged in various other ways in which both sides of the material are simultaneously visible. For example, it is conventional for the lower edge of a window shade to be turned upwardly and stitched to form a loop for receiving a stiffening slat; when this is done, both surfaces of the shade material are visible from the side of the shade on which the loop is formed. With the sheet material, of this invention, having ribs formed on both sides, a neat looking inconspicuous loop may be formed. However, with a material having ribs on only one side, such a loop would be very unsightly since it would result in a strip of smooth, surfaced material being stitched across the bottom of a large ribbed surface. This would emphasize both the loop and the nonuniformity of the shade material. Furthermore, draperies and other articles, manufactured from this material, may be hung without concern for the fact that both sides of the material be seen. Also, tie-backs of the same material may be bowed or placed in any other fashion without taking care to hide one side of the material.

While generally it is desirable to have substantially identical ribs on both sides of the material, it may be desirable to provide contrasting ribs on opposite sides. That is the ribs on one surface might be relatively sharp and well defined while those on the opposite surface might be of a lesser thickness and of a more rounded configuration. The degree of similarity between the ribs on opposite sides of the sheet, or the amount of contrast between them can be altered by adjusting various controllable factors of the manufacturing process, as explained in more detail below.

The process by which ribbed sheet material is manufactured involves the extrusion of a hot plastic composition such as vinyl polymer into a thin sheet. A plurality of ribs are formed on one side of the sheet during the extrusion operation and the material is subsequently stretched and cooled in a manner effective to cause the ribs, formed on one side of the sheet, to appear on both sides of the sheet. More particularly, the thermoplastic material is heated in an extruding machine and forced under pressure through an annular orifice. Either the inner, or outer edge of the orifice is provided with a plurality of spaced notches, each notch corresponding to one rib of the finished sheet. A greater quantity of material is forced through the notches than is forced through the rest of the annular space. Consequently a series of ribs are superimposed on one surface of the thin sheet. After emerging from the orifice the cylindrical plastic tube is drawn upwardly from the extruder head by a pair of rolls, engaging the tube at their nip. Air is injected through the central portion of the extruder head and is entrapped within the tube by the nip of the overhead rolls. The air pressure is effective to maintain the plastic tube in a cylindrical configuration and to cause the tube to be expanded, reducing its thickness to a predetermined value. The plastic material, which emerges from the extruder in a hot soft deformable state, is cooled by the surrounding air and is set by the time it reaches the overhead rolls, and after passing between these rolls is wound upon a drum from which it is later removed and slit to form a single layer sheet.

One of the discoveries upon which this invention is predicated is that a sheet of material manufactured in this manner has a ribbed configuration on both of its surfaces, even though the die in the extruding machine is shaped to form ribs on only one surface. In the apparatus just described, one surface of the die discharge passageway is perfectly smooth, while the other side is notched. Thus the material emerges from the die with ribs formed on only one side. However, as the material, which leaves the die at a temperature of several hundred degrees Fahrenheit, starts to cool due to its contact with the surrounding air, it does not do so uniformly. Rather, a differential cooling is established, the temperature of the thin portions of the material being reduced much more rapidly than that of the thicker, ribbed portions. As a result the thin portions shrink away from the ribs leaving a portion of the ribs projecting from the surface which was originally smooth. This projecting portion, in effect, constitutes a new rib on the opposite surface from that upon which the rib was originally formed, and in fact, under proper conditions these ribs will be practically identical. However, variations in the shape of the notches, the die temperature, the material being extruded, the rate of extrusion, and other controllable factors can be made to alter the similarity of the ribs on opposite sides of the sheet.

Other advantages of the present invention will be more clearly understood from a consideration of the following detailed description of the drawings.

Figure 2:
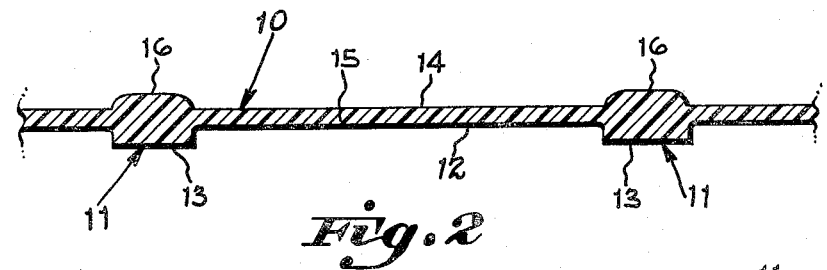
Figure 2 is a greatly enlarged cross sectional view through a sheet of material, the section being taken transverse to ribs.
Figure 3:
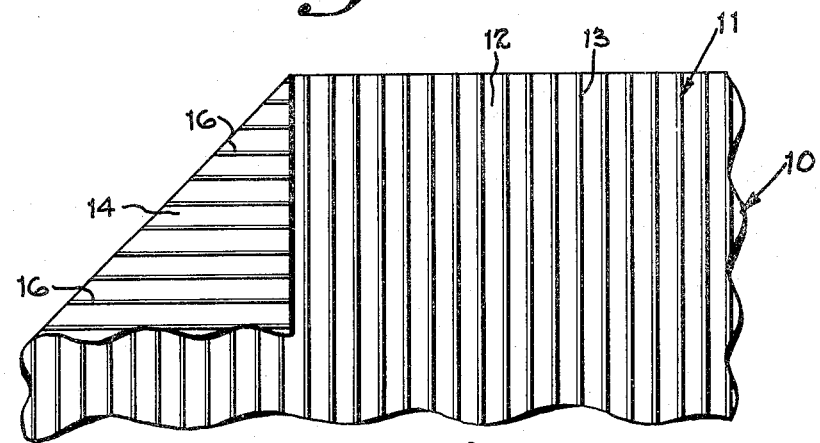
Figure 3 is a fragmentary elevational view of a piece of material, the corner being turned over to show the similarity in appearance of the opposite surfaces.

One form of ribbed sheet material manufactured in accordance with this invention is illustrated in Figures 2 and 3. As shown, a thin sheet of thermoplastic material 10, generally of the order of several thousandths of an inch thick, is provided at spaced intervals with a plurality of ribs 11. In the particular sheet shown, the ribs are spaced at equal intervals and all of the ribs extend parallel to one another. An attractive effect can also be achieved by spacing the ribs nonuniformly across a sheet; alternatively the ribs may be spaced considerably closer together than those shown, to achieve a corduroy effect, or substantially further apart to simulate bands or pin stripes of the type woven into fabric. Additionally, the substantially rectangular cross section of the ribs shown in Figures 2 and 3 may be changed by altering the cross section of the notches in the die through which the sheet is extruded.

In the piece of material illustrated, the ribs on opposite surfaces of the sheet appear to be substantially identical; indeed to the casual observer there is almost no difference between them. However, by varying certain factors in the manufacturing process, as explained later, some control can be exercised over the similarity of the ribs on opposite sides of the material, so that if desired, sheets having ribs on opposite sides which obviously contrast with one another can be produced.

Surface 12 of ribbed sheet 10 shown in Figure 2 passed through the die in contact with the notched portion of the annular discharge passageway. Ribs 13—13 on this surface were formed by an excess of material flowing through the notches formed in the die piece. Surface 14, on the other hand, passed through the die in contact with the smooth surface of the discharge passageway. This surface was smooth when it emerged from the die. However, the differential cooling of the thickened, ribbed sections 11—11 compared with the thin wall section 15, along with the lateral stretching of the material, resulted in the wall sections shrinking away from the ribbed portion. As a result, ribs 13 originally formed on only one side of the sheet, also appears on the opposite side, as ribs 16—16. Ribs 16—16 are substantially similar to the corresponding ribs 13—13 on the opposite surface, except that they can not extend outwardly as far and their corners are slightly more rounded. These differences between the ribs are unnoticeable to the casual observer and the material can be arranged so that its opposite surfaces are both visible, without making people aware of the fact that one surface differs from that of the other.

Figure 1:
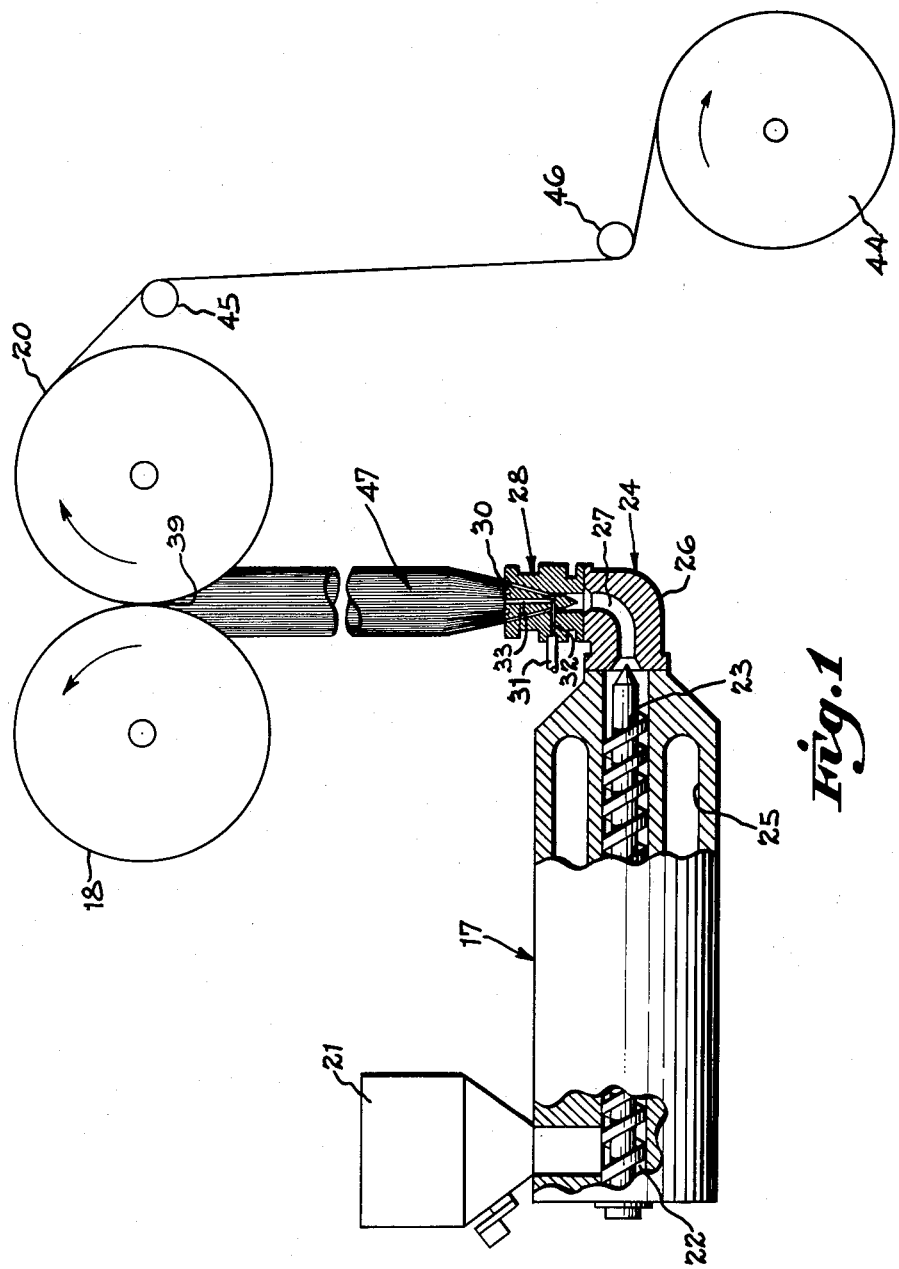
Figure 1 is a diagrammatic side elevational view of an extruding machine arranged for producing ribbed sheets in accordance with this invention.

Figure 1 discloses one form of apparatus for producing a ribbed plastic sheet of the type described and shows the manner in which this apparatus is employed in accordance with the principles of this invention. As shown, an extruding machine 17 of any suitable type is disposed beneath a pair of overhead rolls 18 and 20. The extruder is provided with a feed hopper 21 through which thermoplastic material of the desired composition is introduced to the main chamber 22, of the extruder. While the material used to manufacture the sheet material is referred to as being of a thermoplastic type it is contemplated that the present process can also be employed with certain thermosetting materials now being developed. Chamber 22 is cylindrical in shape and contains a single threaded pitch screw 23 which is rotated by means of a motor and drive not shown. The screw is effective to propel the plastic material from the hopper end of chamber 22 toward head 24. Suitable heating means such as jacket 25 surround chamber 22 and function to keep the plastic material at a temperature above its melting point.

Extrusion head 24, including elbow member 26, is secured to one end of extruder 17, elbow 26 contains a right angle bore 27 in communication with the discharge end of chamber 22. A die assembly 28 is mounted on one end of elbow 26 and includes an annular discharge opening 30 in communication with bore 27. Die assembly 28 also carries air inlet pipe 31, which is connected, through passageway 32, to central passageway 33 within the die. Suitable controls, not shown, are provided for controlling flow of air through pipe 31.

Figure 4:
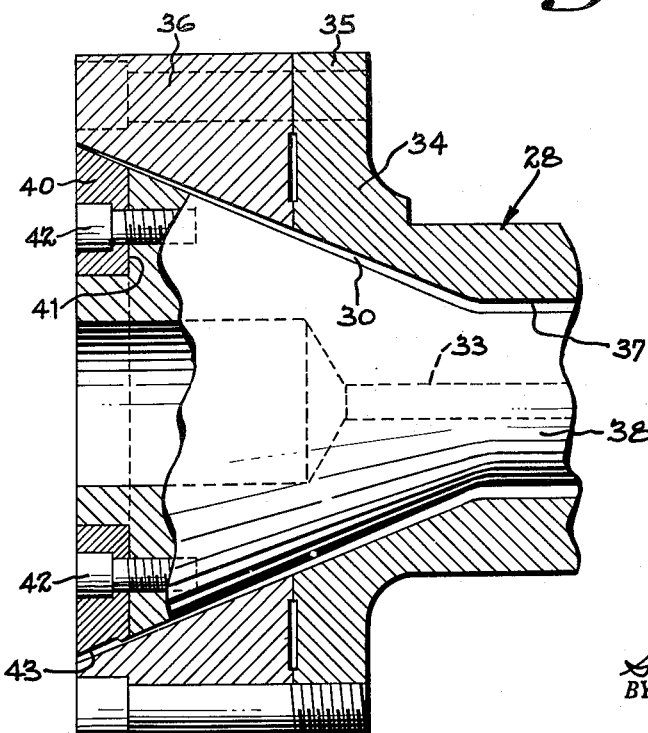
Figure 4 is a simplified cross sectional view of a head for the extruding machine shown in Figure 1.

The die assembly is shown in greater detail in Figure 4, that view being somewhat simplified to emphasize those features of the die construction relating to the present invention. As there shown, die assembly 28 includes a female member 34 which connects to elbow 26; member 34 terminates in a flange 35 to which is bolted an outer ring 36. The female die member and outer ring 36 are configurated to form a central opening 37, shaped like a truncated cone, the base of the cone lying adjacent the outer edge of the die.

A male die piece 38 is disposed within the central opening in female member 34 and outer ring 36, forming annular discharge passageway 30. In the preferred embodiment, a second ring 40 is mounted at the outer end of the male die piece 38 and is secured to shoulder 41 by means of bolts 42. Ring 40 is provided with a plurality of spaced notches 43, preferably in the form of longitudinal grooves. These grooves may be regularly or irregularly spaced depending on the pattern of ribs desired on the finished sheet. Also, the cross-sectional configuration of the notches, as well as their size, may be varied to produce ribs of the desired shape. Ribs of the type shown in Figure 2 are produced using a ring having equidistant, substantially rectangular notches.

One of the principal advantages of employing an inner ring, such as ring 40 is that its use facilitates switching from the production of one type of sheet material to the production of a different type; the ring may be readily removed and replaced with a plain one if straight sheet material is to be produced, or with a differently notched ring if another kind of ribbed sheet is to be produced. It is also possible to notch the male die member itself, eliminating the ring, or alternatively to place the notches in outer ring 36, or the female die piece.

Overhead rollers 18 and 20 (Figure 1) are mounted so that the nip 39 between them is disposed directly above the extruder head; the exact distance of the rolls from the extruder is not critical, but I have found that a distance of the order of 20 feet works very well. Three other rolls are provided in addition to the overhead rolls. A storage roll 44, or reel is used for storing the rolled up flattened sheet after its passage between the overhead rolls, and guide rolls 45 and 46 are provided for directing the sheet from the overhead rolls to the storage roll.

While there are considerations which render it preferable to extrude the tubing upwardly from the extruder head to the nip of the rolls, the principles of this invention can also be applied in installations where the tube is extruded horizontally or downwardly. Moreover modifications can be made in the shape of the die discharge orifice. For example certain types of ribbed sheet material can be produced using a flat die rather than a circular one. In this case the width of the discharge orifice could be made extremely small and the step of expanding the sheet omitted.

In using this apparatus to produce a sheet of ribbed material, a quantity of an organic thermoplastic, or other suitable plastic composition together with selected plasticizers, coloring materials or other modifiers is placed in the extruding machine 17 and heated above the melting point. The heated composition is then forced through the notched annular orifice 30 and emerges as a seamless tube 47 one side of which is smooth, the other side having a series of spaced ribs formed thereon as a result of the additional material flowing through the notches in the die. The material is in a deformable viscous state as it leaves the die, but cools below the temperature at which it sets before it reaches the overhead rolls 18 and 20. In fact, the material becomes relatively set after it travels about a foot from the die. As the tube rises, sufficient air is introduced through the central portion of the die to expand the tube to a predetermined diameter. After the air has been introduced it will remain entrapped within the tube, between the dip and the nip of the overhead rolls.

As the material expands its wall thickness is decreased. Furthermore, the differential cooling of the thicker ribs and the thin wall sections, together with the expansion of the tube causes the walls to shrink away from the ribs so that the ribs appear on both sides of the sheet. By the time the sheet leaves the overhead rolls it has taken a permanent set and is then stored upon reel 44 from which it is removed and slit to form a single layer sheet.

Having described my invention I claim:

1. The method of producing a thin, ribbed sheet of material which includes extruding a molten thermoplastic composition in a vertical upward direction in the form of a seamless tube, forming a plurality of ribs on one surface of said tube, drawing said tubing upwardly, inflating said tube as it moves upwardly, and cooling said tubing as it moves upwardly, whereby the ribs formed on one surface appear on both surfaces.

2. A method of producing sheet material comprising continuously extruding a molten plastic composition to form a seamless tube, sealing said tube to the passage of air at a point remote from the point of extrusion, inflating said tube between the point of extrusion and the point of sealing, forming a plurality of ribs on one surface of said tube, during extrusion, cooling said tube during its travel intermediate the point of extrusion and the point of sealing, whereby the ribs formed on one surface appear on both surfaces.

3. The method of producing ribbed sheet material comprising continuously extruding a molten thermoplastic composition in a vertical upward direction in the form of a thin wall seamless tube, said tube being extruded in a cross sectional form constituted by a plurality of thin wall portions and a plurality of thickened rib portions intermedite said thin wall portions, sealing said tube to the passage of air at a point remote from the point of extrusion, inflating said tube between the point of extrusion and the point of sealing, said inflation being effective to expand said tube to reduce the thickness of the thin wall sections, cooling said tube during its travel intermediate the point of extrusion and the point of sealing so that said tube is set before it reaches the point of sealing.

4. The method of producing a thin, ribbed sheet of material which includes extruding a molten thermoplastic composition in a vertical upward direction in the form of a thin wall seamless tube, providing means whereby excessive amounts of said molten composition are extruded at spaced intervals about said tube, said excessive amounts of material forming a plurality of ribs on said tube, sealing said tube at a point remote from the point of extrusion inflating said tube to cause the expansion thereof between the point of extrusion and the point of sealing, cooling said tube during its travel between the point of extrusion and the point of sealing, said cooling being effective to set said tube before it reaches the point of sealing, and splitting said tube after it reaches the point of sealing to form a single layer sheet.

References Cited in the file of this patent

UNITED STATES PATENTS

| 2,519,375 | Jargstorff et al. | Aug. 22, 1950 |
| 2,632,206 | Pierce | Mar. 24, 1953 |

FOREIGN PATENTS

| 314,600 | Great Britain | July 4, 1929 |
| 374,149 | Great Britain | June 6, 1932 |
| 621,796 | Great Britain | Apr. 20, 1949 |